United States Patent [19]
Boden

[11] 4,102,019
[45] Jul. 25, 1978

[54] LOCKING ASSEMBLIES WHICH MAINTAIN BOW LOOPS IN CORDS

[76] Inventor: Ogden W. Boden, 1580 Gaywood Dr., Altadena, Calif. 91001

[21] Appl. No.: 774,937

[22] Filed: Mar. 7, 1977

[51] Int. Cl.² ............................................. F16G 11/04
[52] U.S. Cl. .................................... 24/117; 24/136 R
[58] Field of Search ................. 24/115 R, 115 H, 117, 24/118, 122.6, 136 R, 136 B; 403/209, 211, 374

[56] References Cited

U.S. PATENT DOCUMENTS

| | | | |
|---|---|---|---|
| 667,175 | 2/1901 | Atkinson | 24/117 R |
| 3,138,839 | 6/1964 | Mathes | 24/117 R |
| 3,845,575 | 11/1974 | Boden | 24/136 R |

FOREIGN PATENT DOCUMENTS 663,136   7/1938   Fed. Rep. of Germany ..... 24/117 R

Primary Examiner—Kenneth J. Dorner
Attorney, Agent, or Firm—William P. Green

[57] ABSTRACT

A cord locking device including a body containing a central passage through which cords extend, and within which the cords can be releasably retained against longitudinal movement by a shiftable locking slide in the passage, with the ends of the cords in locked condition forming loops having a bow-like configuration and extending outwardly away from the body and then back to the body, and with the body containing two side passages located at opposite sides respectively of the main central passage and adapted to receive and hold the second ends of the loops to maintain the looped configuration.

11 Claims, 9 Drawing Figures

LOCKING ASSEMBLIES WHICH MAINTAIN BOW LOOPS IN CORDS

BACKGROUND OF THE INVENTION

This invention relates to improved devices for locking cords against longitudinal movement relative to the device.

My prior U.S. Pat. No. 3,845,575 shows a device for retaining a cord or string against longitudinal movement relative to the device, and in which the ends of the cord or cords are held in a looped contion giving a bow-like appearance. Such devices are useful for example in holding and controlling the ends of a shoe string, or other similar cord or string. In the arrangement of my mentioned patent, the extremities of the shoe string are retained by extension through an opening in a shiftable slide of the locking device, which slide is movable relative to a body of the device and within an inner passage therein to lock and release the cord. Other proposals for retaining the ends of a cord or cords are shown in U.S. Pat. Nos. 3,138,839 and 2,318,411.

SUMMARY OF THE INVENTION

The major purpose of the present invention is to provide an improved cord locking device of the above discussed general type, in which the cord ends are retained in looped or bowed condition, and in which the overall cord and locking combination can be assembled with maximum ease and simplicity, and will present an optimum appearance when in use. Desirably, the assembled lock and cord have a very small overall thickness, in order to avoid excessive protrusion of the device from the surface of the shoe or the like.

Structurally, a device embodying the invention includes a body containing a central passage through which two cords extend (which "two cords" may in fact be opposite ends of a single cord) and a locking element or slide mounted movably within the central passage to releasably lock the cords against longitudinal movement, with the body containing two additional passages which are located at opposite sides of the main central passage and are adapted to receive and hold the cords near their extremities in a manner retaining the cords in the desired looped configuration. The two side passages at opposite side of the main central passage preferably extend in essentially the same direction as the central passage itself, and may be open at both ends so that the tips of the two cords can be threaded into the passages in either of two opposite directions to attain two different bow appearances. A pair of spaced walls of the body may serve dual purposes, as the outer walls of the central cord passage of the device, and inner walls of the two opposite side passages respectively. In this event, the two mentioned walls may have inner converging surfaces facing inwardly toward and defining opposite sides of the central passage, and have outer non-converging surfaces forming the inner sides of the two side passages. Additional walls extending between the front and rear sides of the body at locations spaced laterally outwardly beyond the two first mentioned walls may define the outer sides of the two side passages.

BRIEF DESCRIPTION OF THE DRAWING

The above and other features and objects of the invention will be better understood from the following detailed description of the typical embodiments illustrated in the accompanying drawings in which.

DESCRIPTION OF THE PREFERRED EMBODIMENTS

Figure 1:
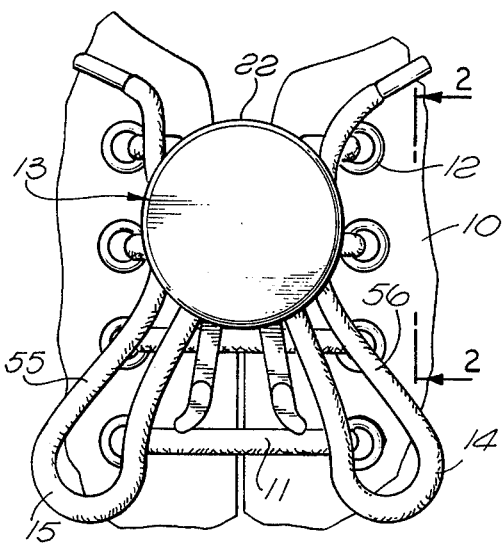
FIG. 1 is a fragmentary front view of a cord locking assembly constructed in accordance with the invention, and shown as utilized for retaining a shoe string against loosening movement.
Figure 2:
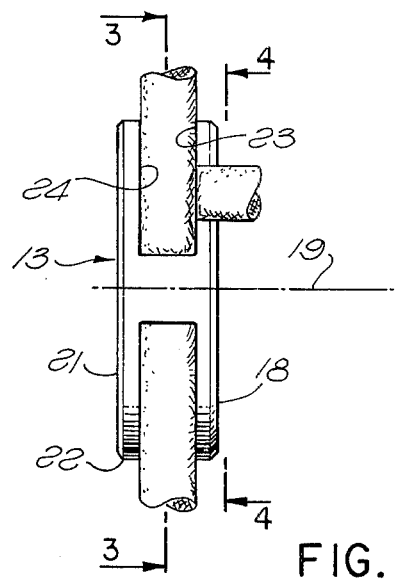
FIG. 2, is an enlarged side view taken on line 2—2 of FIG. 1.

With reference first to FIG. 1, I have represented fragmentarily at 10 shoe which is closed by a conventional shoe string 11 threaded through two parallel rows of eyelets 12. The opposite ends of string 11 are releasably retained in tightened condition by a cord locking device 13 which is constructed in accordance with the invention and holds the string in a manner forming two similar loops 14 and 15 giving the appearance of a bow knot. It will of course be understood that the two cord ends which are secured together by the device 13 may in some instances be portions of two entirely separate cords, rather than opposite ends of a single string or cord as shown. In the claims appended to this specification, the two cord ends are for simplicity referred to as two cords.

The locking device 13 includes a body 16 and a relatively movable locking slide 17, both of which may be molded from an appropriate resinous plastic material or materials selected and dimensioned to give body 16 the characteristics of an essentially rigid element in use, and to give slide 17 a capacity for resilient defomability as will be discussed hereinafter.

Body 16 has a front wall 21 which is essentially flat or planar and disposed transversely of an axis 19, with the peripheral edge 22 of wall 21 being circular about axis 19 as seen in FIG. 1. A rear wall 18 of body 16 is planar and disposed transversely of axis 19 and is parallel to front wall 21 and of the same circular outline configuration except insofar as the peripheral edge 20 of wall 21 may be interrupted by two circularly spaced notches or cutaways 123 and 124 at the locations illustrated in FIG. 4.

Between the planar rear surface 24 of wall 21 and the parallel planar front surface 23 of wall 18, body 16 forms a main central passage 25 through which the two cord portions 26 and 27 extend. The passage 25 may be considered as extending essentially along an axis 28, which is also the direction of sliding movement of locking unit 17. Passage 25 is defined by surfaces 23 and 24, and by two laterally spaced walls 29 and 30 extending between those surfaces 23 and 24 and interconnecting front wall 21 and rear wall 18. At their inner sides, walls 29 and 30 have opposed planar surfaces 31 and 32 which converge as they advance upwardly as viewed in FIG.

3, to form opposite sides of the tapering passage or throat 25 within slide 17 and the cords are received.

Figure 5:
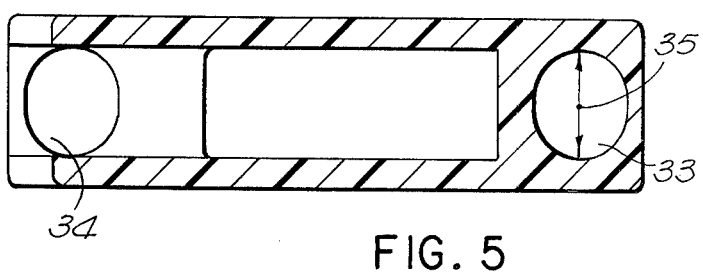
FIG. 5 is a transverse section taken on line 5—5 of FIG. 3.

At opposite sides of main passage 25, body 16 forms two smaller side passages 33 and 34 within which end portions of the cord or cords are received. As seen in FIG. 5, these passages may be of approximately circular cross section, typically slightly enlarged in the direction represented by the arrow 35 of FIG. 5, with the cross sectional size of these passages 33 and 34 preferably being just slightly smaller in at least one transverse direction than the normal diameter of the shoe string, so that when the shoe string is threaded through each of these passages it is closely confined therein and slightly deformed from its normal cross sectional configuration in a manner effectively retaining the engaged portion of the string frictionally against longitudinal movement and therefore in essentially fixed position relative to the body unless forceably moved relative thereto. The passages 33 and 34 are defined at their inner sides by approximately cylindrically curved surfaces 36 and 37 formed on the outer sides of walls 29 and 30, which thus function as partitions between the various passages. The outer sides of passages 33 and 34 are defined by inner approximately cylindrically curved surfaces 38 and 39 formed on short walls 40 and 41 extending between and connecting front and rear walls 21 and 18 of the body at their opposite side edges. As will be apparent from FIGS. 3 and 5, the side passages 33 and 34 desirably extend in approximately the same direction as main central passage 25, and for best results have their longitudinal axes 42 and 43 disposed exactly parallel to axis 28 of the central passage. It is also noted that the length m of outer walls 40 and 41 in the direction of the axes 28, 42 and 43 is preferably substantially less than the length n of walls 29 and 30 in the same direction.

Figure 3:
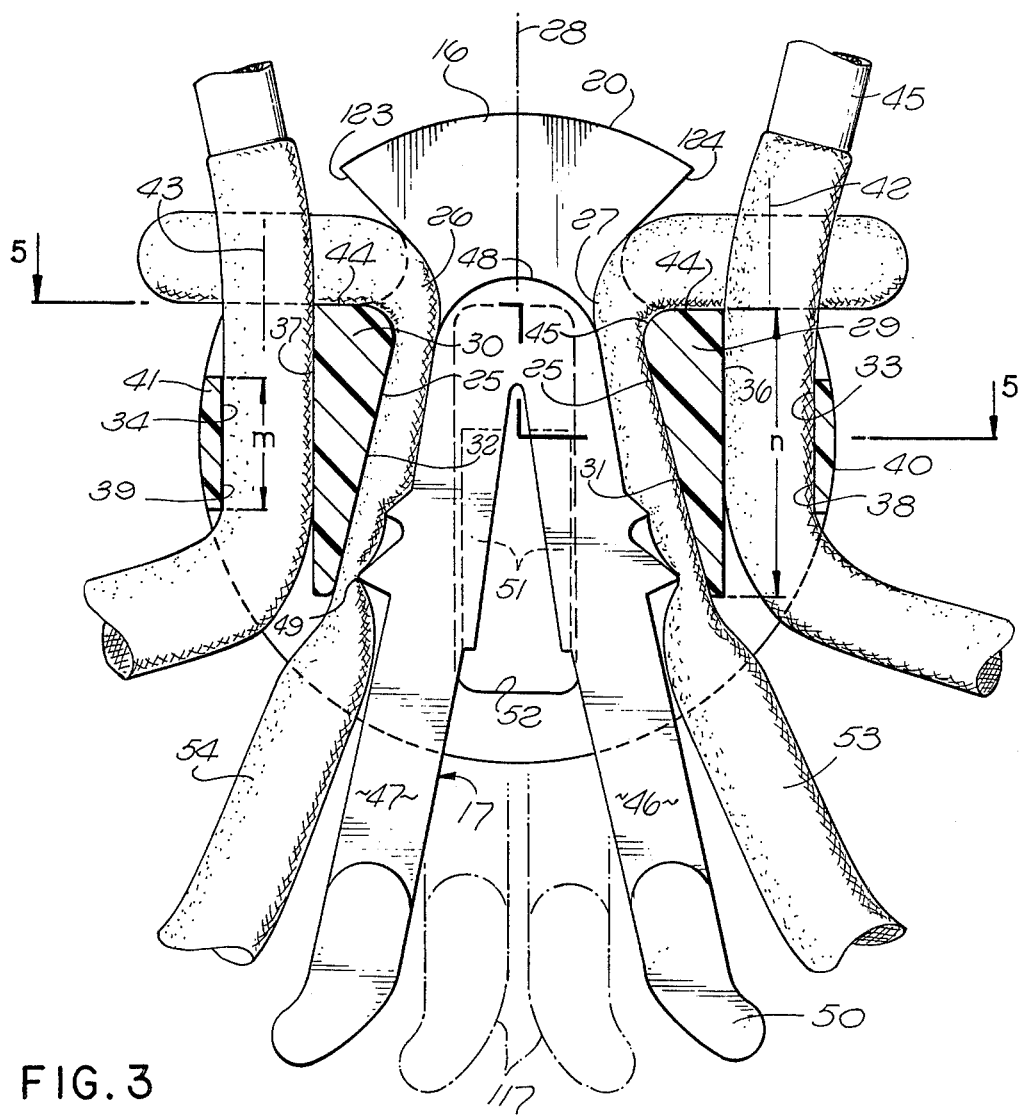
FIG. 3 is a section taken on line 3—3 of FIG. 2.

At the upper ends of walls 29 and 30 as viewed in FIG. 3, these walls have end surfaces 44 which are disposed transversely of axis 28 and merge with surfaces 31 and 32 at rounded corners 45, so that the cords can be turned laterally adjacent these surfaces 44 as shown in FIG. 3. The previously mentioned notches 123 and 124 in rear wall 18 are located just upwardly beyond the location of surfaces 44 as viewed in FIG. 3, so that after the cords have been turned laterally adjacent surfaces 44 they can be pulled rearwardly into notches 123 and 124 if desired to avoid interference with the tips 45 at the ends of the shoestring and the portions of the string adjacent those tips, and to facilitate extension of the cords rearwardly into two of the grommets 12.

The slide 17 which is illustrated in FIGS. 1 to 6 has been disclosed in great detail in my U.S. Pat. No. 3,965,544, and takes the form of an essentially U-shaped part having two arms 46 and 47 joined integrally together by a return bend portion 48 of the slide, and having teeth 49 at their outer sides positioned to press the two cords or cord portions laterally against converging side wall surfaces 31 and 32 of passage 25 to lock the cords against upward movement in FIG. 3. The resilience of parts 17 normally urges arms 46 and 47 relatively apart and toward their locking positions, and the arms can be retracted inwardly away from surfaces 31 and 32 and to positions such as those represented in broken lines at 117 in FIG. 3 by manual engagement of two handle portions 50 formed at the extremities of the arms 46 and 47. When thus squeezed together, the arms 46 and 47 can be pulled downwardly in FIG. 3 to a position in which the cords can be pulled freely in either direction within passage 25. The movement of slide 17 along axis 28 is limited by engagement of lugs 51 formed on arms 17 with the opposite ends of an elongated slot 52 in rear wall 18 into which lugs 51 project.

In applying the locking device 13 to the shoe of FIG. 1, the two ends of cord 11 after passing through the upper grommets 12 of the shoe are passed downwardly through central passage 25 of body 16, are then allowed to extend downwardly beyond passage 25 at 53 and 54, and ultimately curve back upwardly at 55 and 56 toward passages 33 and 34. The tips 45 of the cord or string are threaded upwardly through passages 33 and 34 and to the FIG. 3 positions in which the tips may be located just upwardly beyond body 16, with the portions of the cords which are received within passages 33 and 34 being frictionally retained at set locations therein. The slide 17 is apropriately located within passage 25, between the two cords or cord portions as seen in FIG. 3, and will act to lock the cords against upward movement within passage 25 while permitting free downward movement of the cords therein. The portions 53 and 54 of the cords may thus be pulled downwardly until the shoe has been properly tightened on the foot of the wearer, and slide 17 will automatically retain the cord in this tight position with the loops 14 and 15 giving to the string the appearance of a bow knot. When it is desired to loosen the string, the wearer merely squeezes the two handle portions 50 of slide 17 together and moves the slide downwardly to enable the two portions of the cord to move upwardly within passage 25 as far as may be desired.

Figure 6:
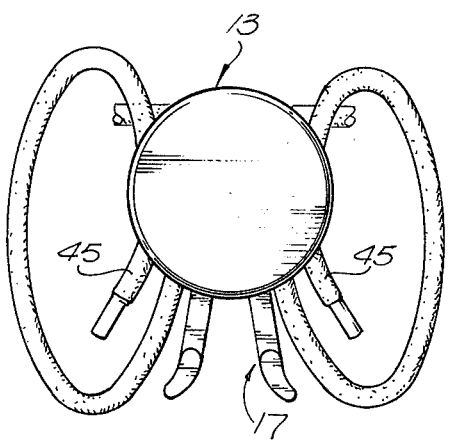
FIG. 6 shows the device of FIGS. 1 to 5 with the ends of the cord or shoestring inserted in their retaining openings in reverse direction.

Instead of threading the cord tips 45 upwardly within the opposite side passages 33 and 34 of the device, the tips may be threaded downwardly through those passages as seen in FIG. 6, to give the bow loops a somewhat different appearance, but with the locking characteristic remaining the same.

Figure 7:
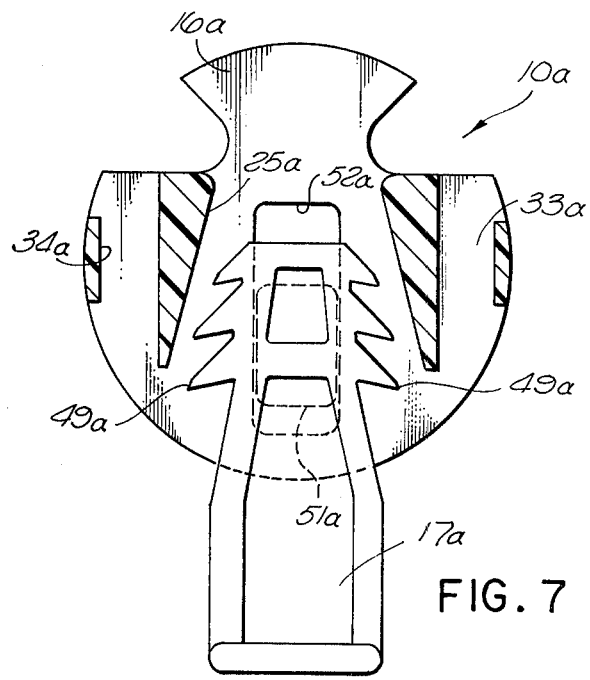
FIGS. 7 and 8 are views similar to FIG. 2, but showing the device with two variational types of locking slides.

In the variational type of locking device illustrated at 10a in FIG. 7, the body 16a may be identical with the previously described body 16 of the first form of the invention, but with a different type of slide 17a being provided. In particular, this slide 17a is not of the U-shaped double arm type shown in FIG. 3, but rather is a solid element having two sets of teeth 49a formed at opposite sides thereof in fixed relative positions, with a lug 51a at the rear side of slide 17a projecting into a slot 52a corresponding to slot 52 of FIG. 3, to retain the slide in its assembled position within the body while allowing upward and downward relative movement of the slide to lock and release the cords. As in the first form of the invention, the body 16a of FIG. 7 contains a central main passage 25a and two side passages 33a and 34a on opposite sides of passage 25a and the contained slide. The cords or string ends are passed through and locked in main passage 25a in the same manner discussed in connection with the first form of the invention, and are then looped to form an essentially bow shaped pattern and doubled back into side passages 33a and 34a as in FIG. 3 or FIG. 6.

Figure 4:
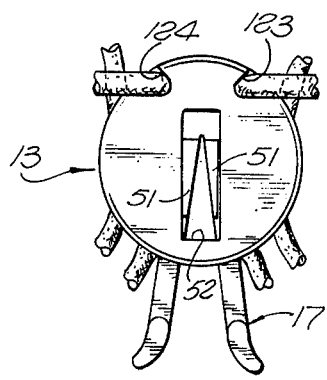
FIG. 4 is a rear view of the device taken on line 4—4 of FIG. 2.
Figure 8:
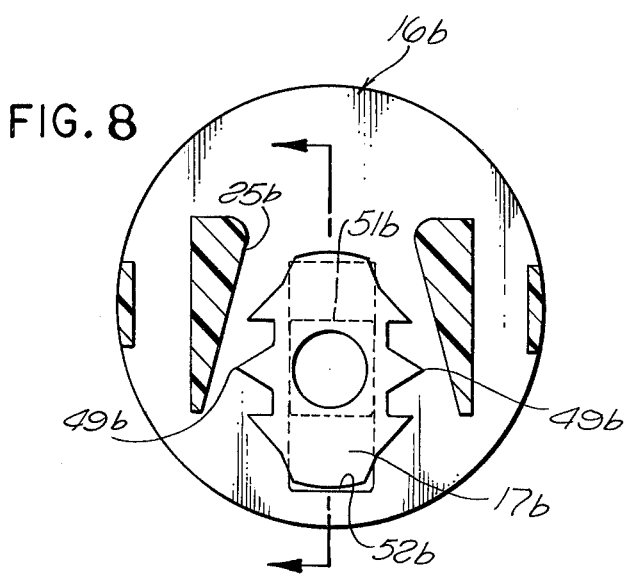
Figure 9:
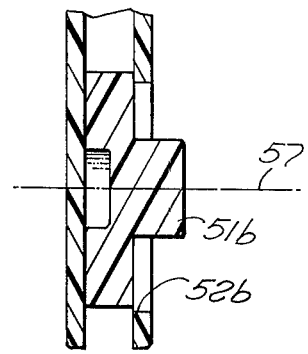
FIG. 9 is a sectional view taken on line 9—9 of FIG. 8.

In FIG. 8, the body 16b is typically illustrated without the notches 123 and 124 of FIGS. 3 and 4, but may otherwise be the same as body 16 of the first form of the invention. It will of course be understood that the notches 123 and 124 may either be provided or not in any of the forms of the invention, as may be desired for a particular use. The slide 17b of FIG. 8 is located entirely within the body except for extension of an actuating or shifting button 51b through slot 52b in the rear wall of the body. This button 51 is thus accessible for manual actuation by the thumb of a user, to move the slide upwardly and downwardly in FIG. 8 for locking or releasing the cords. Two sets of teeth 49b formed on opposite sides of slide 17b engage the two cords or cord portions to press them against the walls of tapering throat 25b. It also may be noted that button 51b may be of square or rectangular cross section (see FIG. 8) and of a width corresponding to the width of elongated slot 52b, in a manner retaining the button and the rest of part 17b against turning movement about an axis such as that represented at 57 in FIG. 9.

While certain specific embodiments of the present invention have been disclosed as typical, the invention is of course not limited to these particular forms, but rather is applicable broadly to all such variations as fall within the scope of the appended claims.

I claim:
1. The combination comprising:
   a fastener body containing a central passage having first and second ends and a restricted locking portion;
   two cords extending through said passage; and
   a locking unit located at least partially within said passage and movable relative to said body between a locking position in which it grips said cords tightly and locks them against longitudinal movement toward said first end of said passage and a released position permitting such movement;
   said cords having portions extending out of said second end of said passage to the outside of the body and forming respectively two loops which extend first outwardly away from said body and then back to the body at opposite sides of said passage;
   said cords being retained at first ends of said loops by said gripped engagement with said unit;
   said body containing two side passages located at opposite sides respectively of said central passage and said unit therein, and which receive and hold portions of said cords at second ends of the loops in a relation retaining and locating said portions at said opposite sides of the central passage and locking unit and maintaining the looped configuration of both cords;
   said body having two spaced walls defining opposite sides of said central passage and which have inner surfaces converging toward one another to wedge said cords together in conjunction with said locking unit, said spaced walls having outer surfaces which extend in essentially a common direction without convergence and serve as inner wall surfaces of said two side passages respectively.

2. A cord locking device comprising:
   a body containing a central passage through which two cords are to extend and having first and second ends and a restricted locking portion; and
   a locking unit located at least partially within said passage and movable relative to said body between a released position permitting longitudinal movement of said cords toward said first end of the passage and a locking position in which said unit prevents such cord movement and in which said cords can extend out of said second end of said passage to the outside of the body and form respectively two loops which extend first outwardly away from the body and then back to the body at opposite sides of said passage;
   said body containing two side passages which are located at opposite sides respectively of said central passage and said unit therein, and which are adapted to receive and hold portions of said cords at second ends of the loops in a relation retaining and locating said portions at said opposite sides of the central passage and locking unit and maintaining the looped configuration of both cords;
   said body including two spaced walls at opposite sides of said central passage and having inner converging surfaces defining opposite sides of said central passage and outer non-converging surfaces defining inner wall surfaces of said side passages respectively.

3. A cord locking device comprising:
   a body containing a central passage through which two cords are to extend and having first and second ends and a restricted locking portion; and
   a locking unit located at least partially within said passage and movable relative to said body between a released position permitting longitudinal movement of said cords toward said first end of the passage and a locking position in which said unit prevents such cord movement and in which said cords can extend out of said second end of said passage to the outside of the body and form respectively two loops which extend first outwardly away from the body and then back to the body at opposite sides of said passage;
   said body containing two side passages which are located at opposite sides respectively of said central passage and said unit therein, and which are adapted to receive and hold portions of said cords at second ends of the loops in a relation retaining and locating said portions at said opposite sides of the central passage and locking unit and maintaining the looped configuration of both cords;
   said body including two spaced essentially parallel front and rear walls, two spaced side walls extending between and interconnecting said front and rear walls respectively and having inner converging surfaces facing into said central passage and outer surfaces defining inner sides of said two side passages respectively, and two additional walls extending generally parallel to but shorter than said side walls and extending between and interconnecting said front and rear walls at locations laterally outwardly beyond said two side walls respectively and defining outer sides of said two side passages respectively, with said front and rear walls defining the front and rear of said side passages.

4. A cord locking device as recited in claim 3, in which said front and rear walls are of similar essentially circular outline configuration.

5. A cord locking device comprising:
   a body containing a central passage through which two cords are to extend and having first and second ends and a restricted locking portion; and
   a locking unit located at least partially within said passage and movable relative to said body between a released position permitting longitudinal movement of said cords toward said first end of the passage and a locking position in which said unit prevents such cord movement and in which said cords can extend out of said second end of said passage to the outside of the body and form respectively two loops which extend first outwardly away from the body and then back to the body at opposite sides of said passage;

said body containing two side passages which are located at opposite sides respectively of said central passage and said unit therein, and which are adapted to receive and hold portions of said cords at second ends of the loops in a relation retaining and locating said portions at said opposite sides of the central passage and locking unit and maintaining the looped configuration of both cords;

said body having a rear wall with two spaced notches formed in the periphery thereof at locations to receive said cords after leaving said central passage.

6. The combination comprising:

a fastener body containing a central passage having first and second ends and a restricted locking portion;

two cords extending through said passage; and a locking unit located at least partially within said passage and movable relative to said body between a locking position in which it grips said cords tightly and locks them against longitudinal movement toward said first end of said passage and a released position permitting such movement;

said cords having portions extending out of said second end of said passage to the outside of the body and forming respectively two loops which extend first outwardly away from said body and then back to the body at opposite sides of said passage;

said cords being retained at first ends of said loops by said gripped engagement with said unit;

said body containing two side passages located at opposite sides respectively of said central passage and said unit therein, and which receive and hold portions of said cords at second ends of the loops in a relation retaining and locating said portions at said opposite sides of the central passage and locking unit and maintaining the looped configuration of both cords;

said body having two spaced walls forming opposite sides of said central passage and each serving as a partition between the central passage and a corresponding one of said side passages to act as an outer wall of the central passage and an inner wall of the corresponding side passage;

said body having a rear wall with two spaced notches formed in the periphery thereof at locations to receive said cords after leaving said central passage.

7. A cord locking device comprising:

a body containing a central passage through which two cords are to extend and having first and second ends and a restricted locking portion; and a locking unit located at least partially within said passage and movable relative to said body between a released position permitting longitudinal movement of said cords toward said first end of the passage and a locking position in which said unit prevents such cord movement and in which said cords can extend out of said second end of said passage to the outside of the body and form respectively two loops which extend first outwardly away from the body and then back to the body at opposite sides of said passage;

said body containing two side passages which are located at opposite sides respectively of said central passage and said unit therein, and which are adapted to receive and hold portions of said cords at second ends of the loops in a relation retaining and locating said portions at said opposite sides of the central passage and locking unit and maintaining the looped configuration of both cords;

said body including two spaced essentially parallel front and rear walls, two spaced side walls extending between and interconnecting said front and rear walls respectively and having inner converging surfaces facing into said central passage and outer surfaces defining inner sides of said two side passages respectively, and two additional walls extending generally parallel to said side walls and extending between and interconnecting said front and rear walls at locations laterally outwardly beyond said two side walls respectively and defining outer sides of said two side passages respectively, with said front and rear walls defining the front and rear of said side passages.

8. A cord locking device as recited in claim 7, including said cords as elements of the claim, with the cords confined closely within said side passages and thereby frictionally retained in essentially fixed positions in those side passages.

9. A cord locking device as recited in claim 7, in which said central passage and said two side passages all extend through said body in essentially a common direction.

10. A cord locking device as recited in claim 7, in which said locking unit is received between said two cords to wedge said cords against opposite side wall surfaces respectively of said central passage upon movement of the locking unit between said positions thereof.

11. A cord locking device as recited in claim 7, in which each of said side passages in the body is open at both ends to the exterior of the body, so that each of the cords may be threaded into one end of a corresponding passage and then out the opposite end thereof.

* * * * *